(12) United States Patent
Lund

(10) Patent No.: US 7,267,010 B2
(45) Date of Patent: Sep. 11, 2007

(54) INERTIAL MASS GUIDED SINGLE AXIS VIBRATION TEST MACHINE

(75) Inventor: Douglas A. Lund, Anacortes, WA (US)

(73) Assignee: Team Corporation, Burlington, WA (US)

( * ) Notice: Subject to any disclaimer, the term of this patent is extended or adjusted under 35 U.S.C. 154(b) by 0 days.

(21) Appl. No.: 11/155,999

(22) Filed: Jun. 17, 2005

(65) Prior Publication Data

US 2007/0062293 A1 Mar. 22, 2007

(51) Int. Cl.
*G01M 7/04* (2006.01)
(52) U.S. Cl. .................................................. 73/663
(58) Field of Classification Search .................. 73/662, 73/663, 665, 666
See application file for complete search history.

(56) References Cited

U.S. PATENT DOCUMENTS

| | | | |
|---|---|---|---|
| 3,921,286 A | | 11/1975 | Petersen |
| 4,011,749 A | * | 3/1977 | Cappel ........................ 73/665 |
| 4,270,390 A | * | 6/1981 | Kimball et al. ............... 73/663 |
| 4,440,026 A | * | 4/1984 | Kimball ........................ 73/663 |
| 5,343,752 A | * | 9/1994 | Woyski et al. ................ 73/665 |
| 5,650,569 A | * | 7/1997 | Liu ............................. 73/663 |
| 6,257,067 B1 | * | 7/2001 | Ankrom et al. ............... 73/663 |
| 6,389,900 B1 | * | 5/2002 | Leist et al. ................... 73/662 |
| 2003/0200811 A1 | | 10/2003 | Woyski et al. |
| 2005/0257619 A1 | | 11/2005 | Fletcher |

FOREIGN PATENT DOCUMENTS

WO 85/03547 8/1985

OTHER PUBLICATIONS

International Search Report and Written Opinion for PCT/US2006/023501, mailed Dec. 6, 2006.

* cited by examiner

*Primary Examiner*—Hezron Williams
*Assistant Examiner*—Rose M. Miller
(74) *Attorney, Agent, or Firm*—Christie, Parker & Hale, LLP.

(57) ABSTRACT

A single axis vibration test system includes a vibration force generator or "shaker" which can be used with a head expander, and separate pairs of hydrostatic self-aligning sliding bearings connecting two large reaction masses to the head expander. Preload forces are applied by separate preload pistons supported on a preload ring surrounding the shaker. Preload forces are transmitted by the preload ring to the sliding bearings to clamp the head expander directly to the reaction masses, which resists lateral and rotational motions during vertical axis testing. The reaction masses are supported on resilient supports carried on a sub-structure rigidly affixed to ground, for avoiding a rigid connection between the preload ring and ground which in turn avoids unwanted mechanical resonances within the operational frequency range of the system during use.

20 Claims, 5 Drawing Sheets

INERTIAL MASS GUIDED SINGLE AXIS VIBRATION TEST MACHINE

FIELD OF THE INVENTION

This invention relates to vibration test machines, and more particularly, to an improved single linear axis vibration test system. One application of the invention is for a vertical linear axis vibration tester.

BACKGROUND OF THE INVENTION

Vibration test machines (also referred to as "shakers") have been used in the past for applying vibrational test loads to a test object to simulate the vibration experienced during actual use conditions. Such vibration test systems have application to the military, aeronautics, aerospace, satellite communications, automotive, and electronics industries, i.e., for providing nondestructive testing of components or devices eventually subjected to vibrational motions during use. One example is testing to simulate the vibration forces of a launch vehicle on a communications satellite. One critical vibration test for communication satellites, as an example, involves use of a single axis vibration test system for testing vibration effects in the vertical axis.

Single axis vibration test machines in the past have experienced certain undesired levels of cross-axis motion, which in turn produce inaccurate test results. The objective of such a vertical axis shaker is to move in the vertical axis only, and to avoid cross-axis motion by resisting any lateral translation motion and any rotational motions around any axis perpendicular to the line of motion. Stated another way, motion around a horizontal axis (pitch and roll motion) is to be resisted.

Conventional single axis shakers have not avoided the unwanted effects of cross-axis vibration. Conventional vertical axis vibration systems have been known to generate undesired cross-axis motions when the inherent mechanical resonances of the system are excited by the vibration applied to the vertical axis.

Commercially available shakers by themselves are often incapable of supporting and guiding large and/or heavy test items. The weight of many test items may exceed the allowable weight specified by the shaker manufacturer, and the center of gravity location may produce moment loads that exceed the allowable load on the shaker. During the vibration test, the dynamic behavior of the test item may produce forces that exceed the allowable values as specified by the shaker manufacturer.

In these situations, auxiliary equipment is required in order to support and guide the test article during the vibration test, and also to protect the shaker from excessive loads that would otherwise be induced by the behavior of the test article during the vibration test.

In one application involving a vertical axis shaker used for vibration testing of a communications satellite, the vertical axis test frequency range is from about 5 to about 200 Hz. Conventional vertical axis shakers and conventional auxiliary test article guidance equipment often have mechanical resonances within this frequency range.

An objective of the present invention is to reduce extraneous cross-axis motions in a vertical vibration test system that uses auxiliary guidance equipment by designing the system to be free of resonances within the range of frequencies to be tested. "System" means the complete mechanical assembly consisting of the shaker, the head expander, and the components that guide the head expander and resist any off-axis forces that may be produced by the test item during the vibration test.

SUMMARY OF THE INVENTION

One embodiment of the present invention comprises a single axis vibration test system comprising a vibration force generator which includes a test object support base. The "support base" is commonly called a "head expander" in a vibration testing application. The head expander increases the surface area available for mounting the item to be tested. The force generator induces single axis motion in a test object affixed to the support base.

A reaction mass is mounted adjacent the support base. One or more reaction masses may be used. The reaction mass is preferably located immediately adjacent to the head expander. Typical mechanical components ordinarily used to rigidly connect the head expander to a reaction mass located some distance away (commonly in the floor that supports the shaker) are essentially eliminated. By eliminating such mechanical connections, mechanical resonances are eliminated and/or forced to occur at higher frequencies which are or designed to be above the maximum test frequency.

Cooperating coupling devices support the vibration force generator for single axis vibration while resisting cross-axis motion. The coupling devices are rigidly connected to the reaction mass. A rigid sub-structure supports resilient support bearings or isolators, which in turn support the reaction mass (or masses). The supporting sub-structure is affixed to ground. The resilient support bearings between the reaction mass and the supporting sub-structure provide a "disconnect" that avoids any rigid mechanical connection between the reaction masses and ground.

In one embodiment, the resilient support bearings comprise air springs. By isolating the reaction masses from a direct rigid connection to ground, the mechanical resonance of the guidance system is outside the range of frequencies applied during the test. The test article may very well have resonances that occur within the range of frequencies applied during the test. Cross axis motion can be minimized by elimination/reduction of resonances in the guidance equipment within the test band frequency.

Conventional vibration test systems have used guide mechanisms, sliders and bearings attached to the vibration test unit, supporting these vertical axis guide systems through rigid mechanical structures affixed to ground. Although it is always desired that these mechanical structures are "rigid," they are not. The result is that mechanical resonances in the guide structure occur within the test band frequency. Stated another way, if the connection to ground were truly "rigid," there would be no undesired mechanical resonance in the head expander guidance equipment.

The present invention avoids a mechanical connection between the head expander guidance components and the reaction mass that would normally have undesired flexibility characteristics (resonances) within the test frequency range.

These and other aspects of the invention will be more fully understood by referring to the following detailed description and the accompanying drawings.

DETAILED DESCRIPTION

Figure 1:
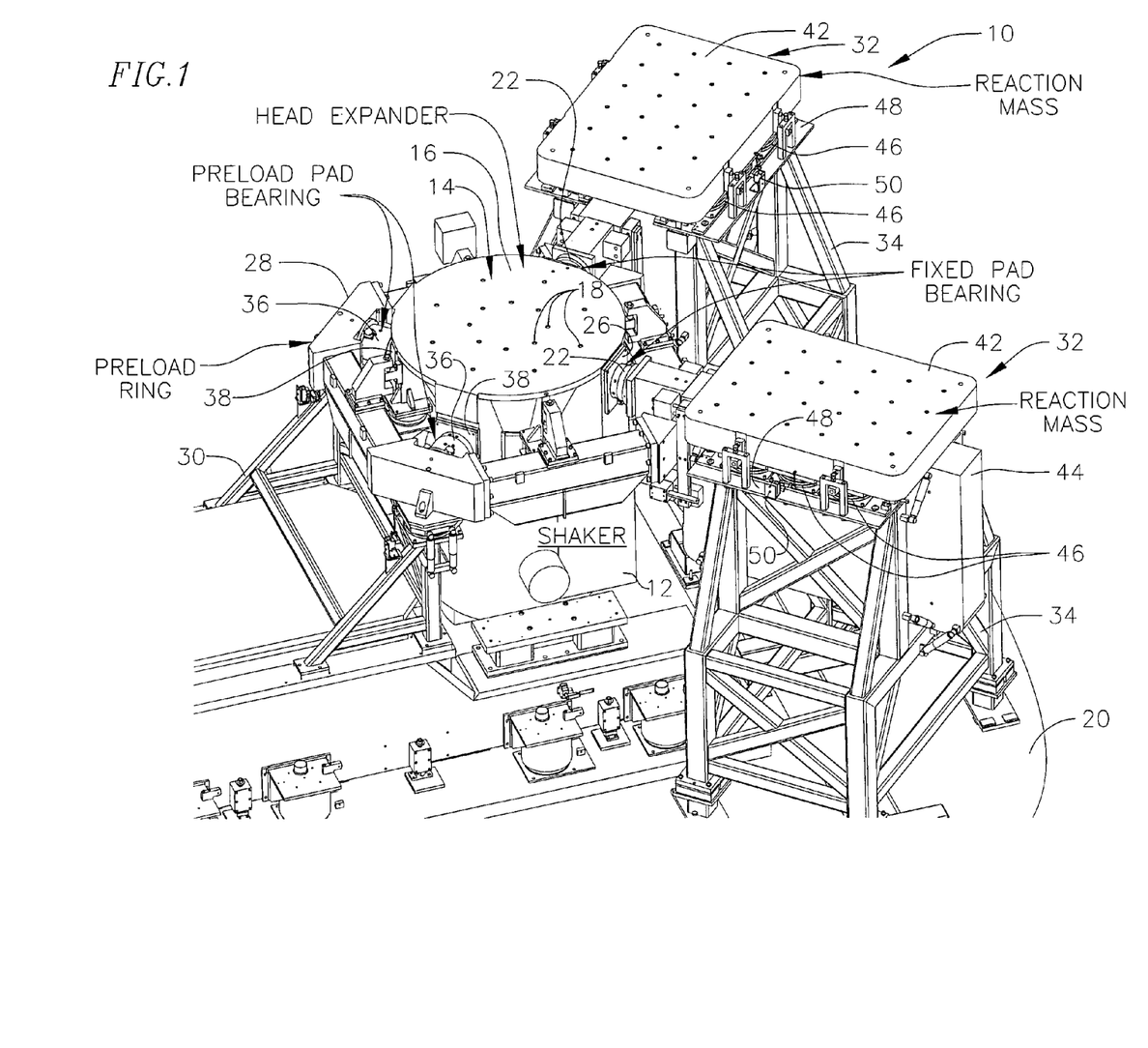
FIG. 1 is a perspective view showing a single axis vibration test machine according to principles of this invention.
Figure 2:
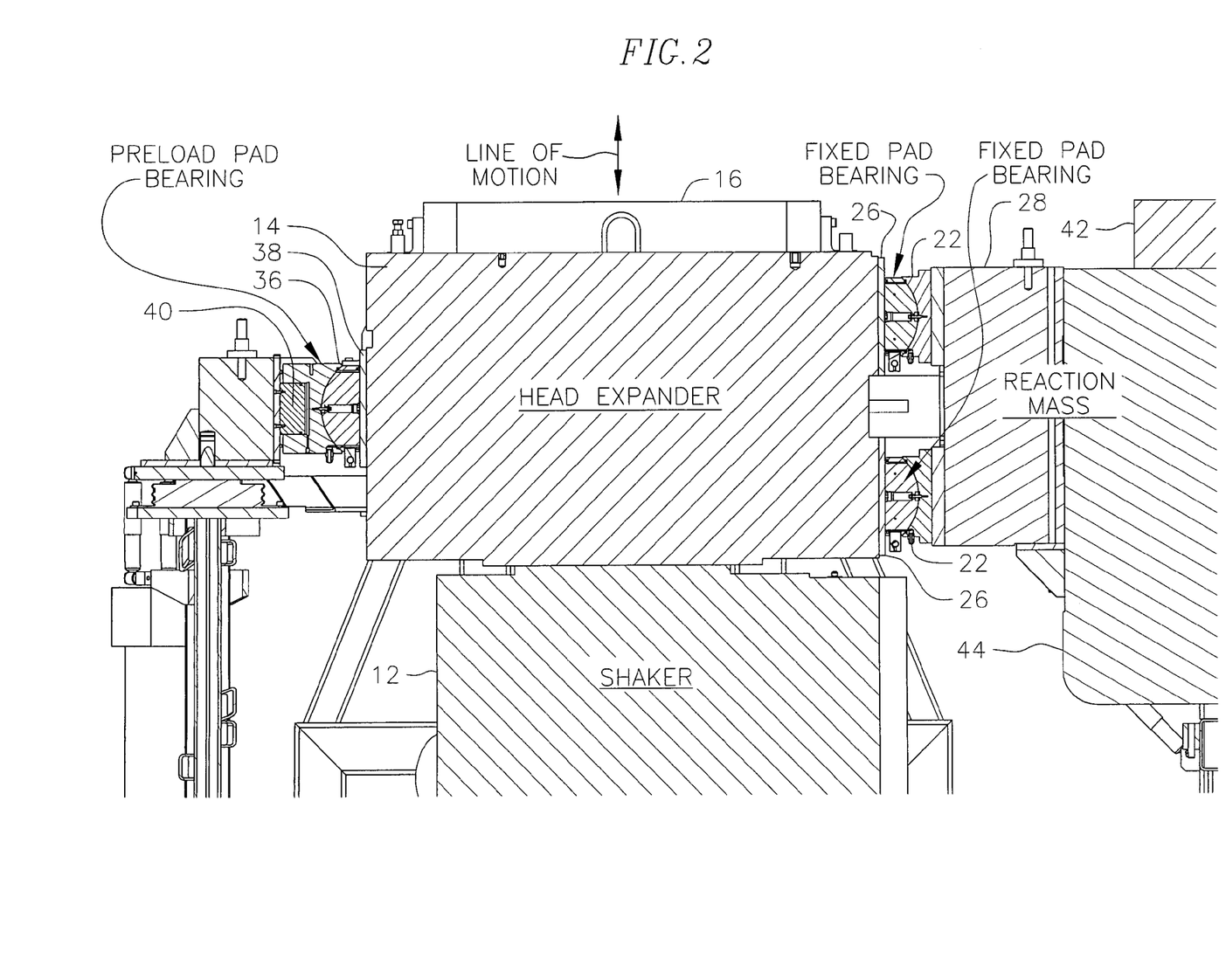
FIG. 2 is a side elevational view, partly in cross-section, showing components of the single axis vibration test machine.

Referring to FIGS. 1 and 2, a single linear axis vibration test system 10 comprises a vibration generator or shaker 12 for applying vibrational energy to a test object (not shown) affixed to a head expander 14 on the vibration generator. The vibration generator preferably comprises an electro-dynamic shaker, and one example is the T-4000 manufactured by Unholtz-Dickie. Other types of vibration force generators can be used. Electro-hydraulic and mechanical are two common alternatives.

In the illustrated embodiment, the shaker carries the head expander 14 for increasing the mounting area of the shaker. Payloads of large footprints can be safely mounted and tested using the head expander.

The head expander 14 is generally cylindrical in shape and comprises a series of round metal plates welded together and supported on a structure comprised of metal ribs which extend radially and are spaced at 45° angles. Head expander shapes are quite variable. They may be round, square, rectangular, or other irregular shapes when required to accommodate a specific item to be tested. The components of the head expander are preferably made of light weight metal such as magnesium, aluminum, and composite materials such as epoxy-graphite. High stiffness and low weight are desired. A top mounting plate or support base 16 of the head expander contains mounting holes 18 for securing the test article to the top surface of the head expander.

In one embodiment, the shaker and head expander are adapted for vertical linear axis vibrational testing of a communications satellite. One example of a communications satellite tested by the head expander guidance system of this invention has a base mounting diameter of about four to five ft., a height of about eight to ten ft., and a weight of about 4,000 lbs.

In the embodiment comprising the satellite as a test object, vertical vibrational test motion is within a frequency range of about 5 to about 200 Hz. Although the invention is described with reference to a vertical axis shaker operating within this frequency range, the invention is adapted for single linear axis vibration testing in directions other than vertical and at higher frequency ranges, especially for test objects weighing less than the communications satellite.

In one embodiment, the body of the shaker is rigidly mounted in a stationary position with its vibrational armature connected to the bottom of the head expander which vibrates atop the shaker. The body of the shaker is not necessarily rigidly mounted. Alternatively, it may be supported on isolators (air springs). The shaker and the other stationary components of the test system are mounted to a floor or other base structure 20 affixed to the floor. This base to which the stationary components are affixed will be referred to generally herein as a static "ground." The "floor" may not necessarily be "rigid." One characteristic of this invention is that it does not require a massive (heavy) floor, which is typically required by current existing head expander guidance equipment designs.

The word "shaker" is commonly understood to mean the "vibration force generator" in the context of vibration testing. In this invention, auxiliary guidance equipment is used to control unwanted cross-axis motion of the shaker armature and/or the head expander. The shaker in its vertical axis embodiment is adapted to resist cross-axis motion so as to produce vertical linear axis motion only. To this end, the head expander is supported and guided for vertical motion by coupling devices comprising two sets of rigid type hydrostatic self-aligning sliding bearings 22, also referred to as "fixed pad bearings." Each set of fixed pad bearings comprises vertically spaced apart upper and lower fixed pad bearings. The bearings are positioned to apply pressure to stationary bearing pads 26 on the side of the head expander. The head expander is allowed to translate (slide) vertically relative to the pad bearings on the oil film that is established and maintained between the pad bearings and bearing pads 26. In one embodiment, the vertical travel of the shaker is about two inches, one inch above and one inch below the neutral axis.

The fixed pad bearings 22 are each rigidly affixed to a large metal preload ring 28 which surrounds the head expander portion of the shaker. The preload ring is a heavy structure shaped generally as an octagon and supported above ground, in part by a rigid support structure 30 on a side of the head expander opposite from the fixed pad bearings. The preload ring may be heavy or light in weight. Its function is to transmit the preload forces from the "self-preloading" pad bearings to the "fixed" pad bearings. This preload ring is not fixed rigidly. It is supported on isolators (air springs). The air springs are located between the support structure 30 and the preload ring at two locations. The opposite side of the preload ring is supported by a pair of reaction masses 32 which in turn are supported above ground by large heavy stationary sub-structures 34 rigidly affixed to ground. The reaction masses and their means of support are described in more detail below.

The fixed pad bearings 22 are rigidly affixed to the preload ring 28. In the illustrated embodiment, the fixed pad bearings are spaced apart by an angle of 90° defined by a pair of radial axes extending horizontally outwardly from the vertical vibration axis in the center of the head expander. The fixed pad bearings are aligned on these radial axes.

A pair of preload pad bearings 36 are rigidly affixed to a side of the preload ring opposite from the fixed pad bearings 22. The preload pad bearings 36 apply opposing preload forces against the fixed pad bearings. The preload pad bearings comprise self-aligning hydrostatic sliding bearings which apply preload forces to corresponding bearing pads 38 rigidly affixed to the side of the head expander. The preload bearings are each spaced apart by an angle of 90 degrees and are aligned on the axes of the corresponding fixed pad bearings, the axes passing through the center of the head expander line of motion.

The hydrostatic pad bearings 36 are initially preloaded against the flat sliding surfaces of the bearing pads 38 so that any forces that may try to separate the sliding bearings from the head expander can be transmitted to the large reaction masses 32. The head expander is allowed to translate (slide) vertically relative to the pad bearings on an oil film. The preload pad bearings include a hydraulic piston 40; and when pressure is applied to the hydraulic piston, the resulting force is transmitted by the preload ring 28 from the preload bearings 36 to the opposing pairs of fixed pad bearings 22. This preload force is also transmitted through the head expander. The result is a compression force established between the fixed pad bearings and the head expander sliding surfaces 26. This compression force is carried from the head expander to the pad bearings through a thin (high stiffness) hydrostatic oil film. The hydrostatic film is maintained at all times by pressurized oil supplied from a remotely located hydraulic supply.

The fixed pad bearings are arranged in pairs that are separated vertically in order to resist rotation of the head expander during vibrational test motion. The two sets of preload pad bearings and the opposing pair of fixed pad bearings are oriented at 90° so that rotations around any horizontal axis can be resisted.

Figure 3:
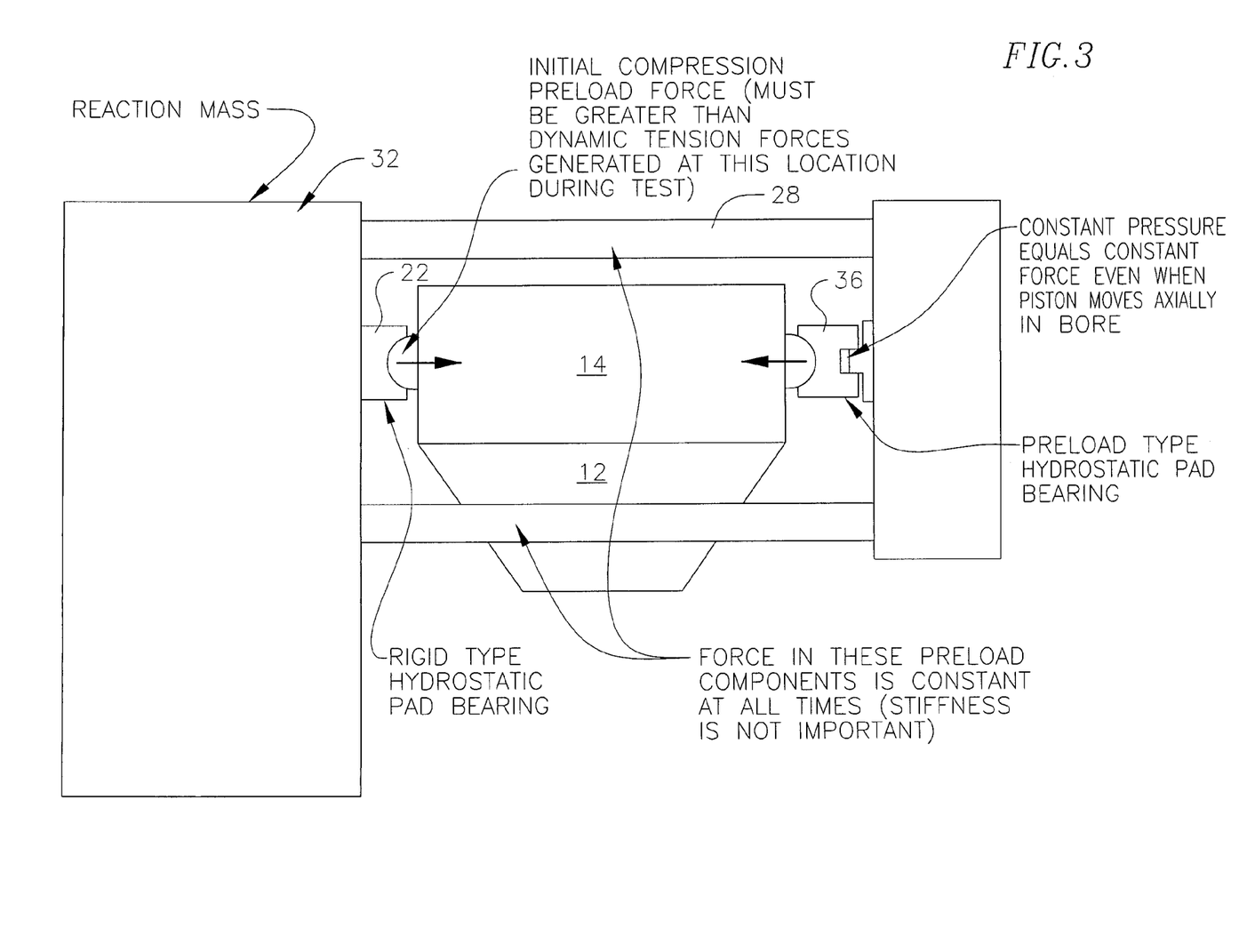
FIG. 3 is a force diagram illustrating preload forces being applied to a head expander.

FIG. 3 illustrates the opposing forces on the shaker provided by the preload system. This diagram illustrates the reaction mass 32 on one side, the preload ring 28 which spans the shaker, the rigid hydrostatic pad bearings 22, and each preload bearing 36 on the opposite side of the shaker. This diagram illustrates application of the initial preload compression force which must be greater than dynamic tension forces generated at the location of the rigid hydrostatic pad bearings during use. This diagram also illustrates application of constant pressure producing constant force at the preload bearings even when the piston moves axially in the bore. The diagram also shows where the forces in the preload components are constant at all times during test. While the forces in the preload pad bearings are constant at all times, including during a vibration test, the forces in the fixed pad bearings will fluctuate during a vibration test.

The reaction masses 22 each include large heavy masses preferably formed as a generally rectangular shaped slab 42 of any heavy or dense material such as steel. The reaction masses are desired to be heavy and to possess a large mass moment of inertia around a horizontal axis. This horizontal axis must be oriented such that the pair of pad bearings attached to the reaction mass can resist head expander rotations induced by the test article. Reaction masses can be constructed from a variety of materials. Metals, concrete, composites, etc., anything that provides the desired weight, center of gravity, and mass moment of inertia can be used. The reaction mass weight is usually chosen based on the weight of the item to be tested and the allowable cross-axis motion. Heavier test items require heavier reaction masses. There is a relationship between reaction mass weight and resistance to cross axis motion. If the test article behavior during test attempts to move the head expander sideways, the weight of the reaction mass can resist this motion. For a given lateral translational force applied by the test article, the heavier the reaction mass, the less motion is produced.

In the illustrated embodiment, each reaction mass is generally T-shaped and also includes a large heavy narrow upright metal structure 44 below and affixed rigidly to the underside of the upper slab portion 42 of the reaction mass structure. The reaction mass also resists rotational motion. In this embodiment, if the same amount of reaction mass weight is distributed vertically in the shape of a constant thickness rectangle that is taller than it is wide, it will then have a greater mass moment of inertia than the same amount of weight arranged in a perfect square (cube) of equal thickness. The rectangular upper slab portion of each reaction mass is positioned in a generally horizontal plane with each reaction mass aligned with a corresponding set of fixed pad bearings 22. The reaction mass shapes are typically chosen after considering the physical space requirements for the test article and the installation site. In some instances, the "most economical" reaction mass shape may interfere with the item to be tested.

The portions of the preload ring 28 which carry the sets of fixed pad bearings 22 are rigidly affixed to a front face of a corresponding horizontal slab portion 42 of the reaction mass. The longitudinal axis of each rectangular slab portion of the reaction mass is aligned on the same radial axis as the corresponding sets of fixed pad bearings, which aligns the pairs of reaction masses on axes spaced apart by an angle of 90°.

In one embodiment, each reaction mass weighs about 20,000 lbs. to support vibration testing of the satellite as described previously.

The narrow upright lower portion 44 of each reaction mass is positioned so as to lower the effective center of gravity of the reaction masses alongside the head expander. The elevation of the large rectangular slab portions 42 of the reaction masses can be adjusted to maximize frequency response. In this example, the c.g. of the reaction mass is located at approximately the same elevation as the midpoint between the pair of vertically spaced pad bearings. The elevation of the reaction masses is adjustable in order to facilitate initial assembly of the components.

The reaction masses are supported on the sub-structures 34 by corresponding resilient bearing systems. Each resilient bearing system provides an elastic means of support for the reaction masses so as to disconnect the reaction masses from any rigid mechanical means of support that would be coupled directly to ground.

In the illustrated embodiment, each resilient bearing system comprises a set of air springs 46 between the stationary sub-structure and the underside of the large rectangular slab portion of the reaction mass. The air springs preferably comprise a set of spaced-apart pneumatic doughnut-shaped bearings aligned along each side of the upright lower portion 44 of the reaction mass. The air springs are mounted to a horizontal support base 48 in the large sub-structure 34 that supports the reaction masses. In one embodiment, there are six air springs that support each reaction mass, in two sets of three air springs aligned linearly along each side of the central lower upright portion 44 of the reaction mass structure.

Figure 4:
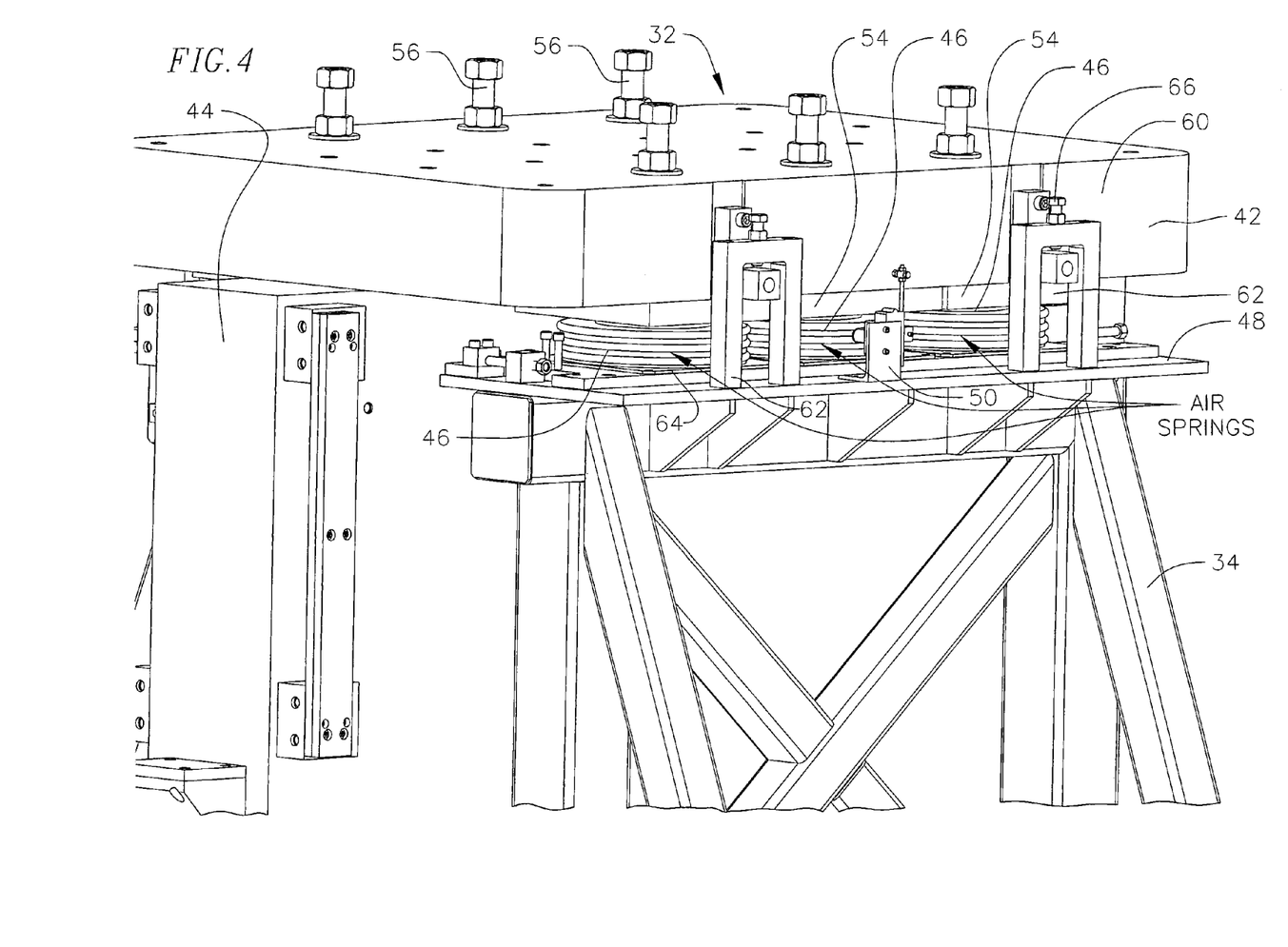
FIG. 4 is a perspective view showing a air springs used to support a reaction mass.
Figure 5:
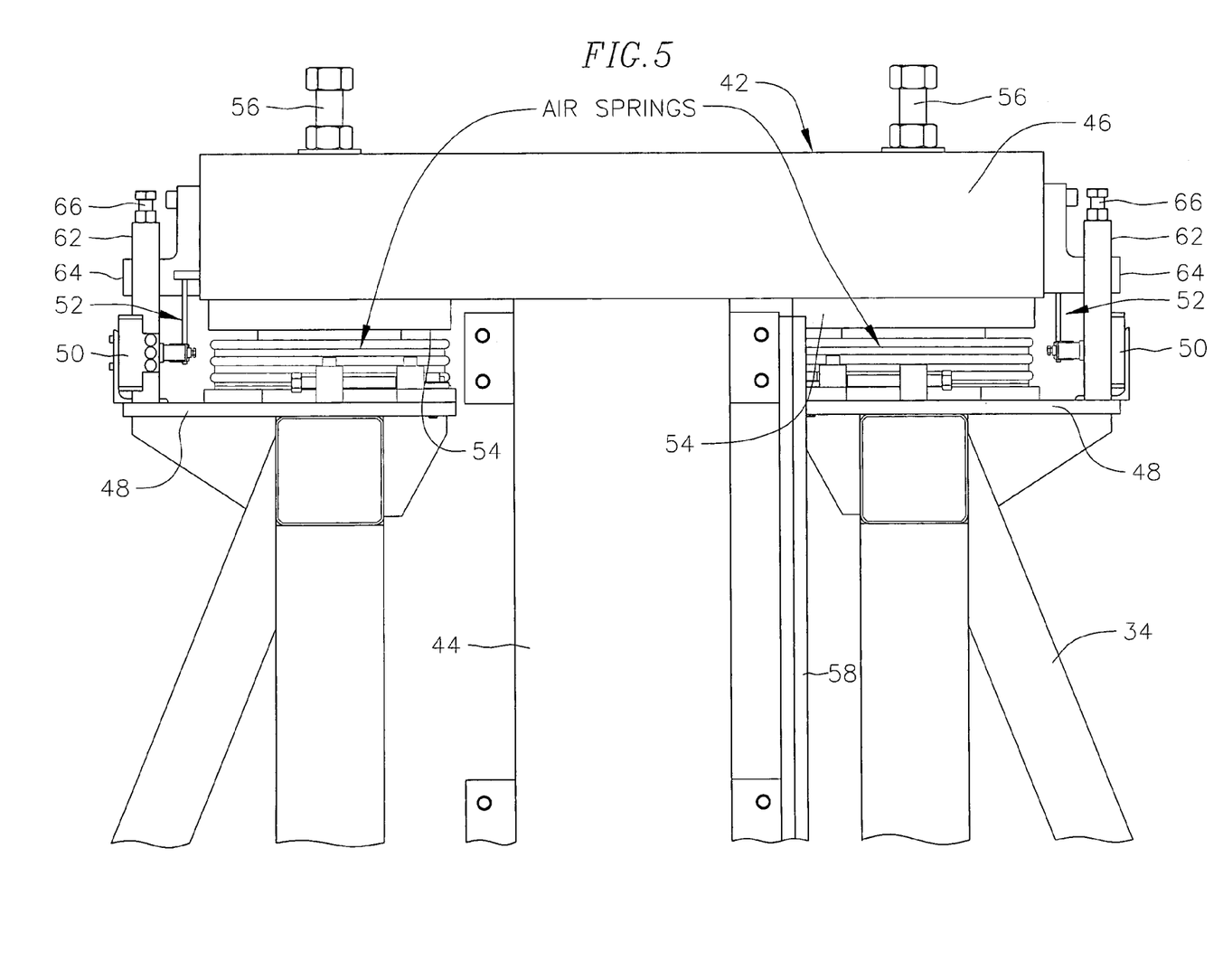
FIG. 5 is a side elevation of the view shown in FIG. 4 to illustrate two rows of air springs.

FIGS. 4 and 5 illustrate detailed construction of the reaction mass 32. These views show the two rows of air springs 46, three per row, along opposite sides of the reaction mass. The bottoms of the air springs are rigidly affixed to the long narrow rigid horizontal supports 48 atop the sub-structures 34 on opposite sides of the reaction mass.

The air springs 46 in the illustrated embodiment are made of molded rubber with internal reinforcing that forms an accordion-like compressible spring. These air springs are available from Firestone or Barry Controls. Each air spring is controlled by an air valve 50. The air valve 50 directly controls the inflated height of the air spring. The internal air pressure is determined by the weight distribution on the various air springs. The air valve does not control air pressure; it adds or releases air from the air springs connected to it by opening internal air valves. A lever arm on each height control valve is connected by a mechanical linkage 52 to the reaction mass. The desired inflation height of the air springs is automatically maintained by the height control valves as weight as added or removed from the system. Inflation height is established by adjusting the mechanical linkage. If a different inflation height is desired, the mechanical linkage is readjusted manually.

The reaction mass 32 is seated on the air springs by separate metal plates 54 at the bottom of the large horizontal slab portion 42 of the reaction mass. These large horizontal plates contact the top portions of the individual air springs. Adjustable bolts 56 atop the reaction mass extend through the large horizontal slab portion of the reaction mass to contact the plates 54. The bolts are adjustable for leveling the reaction mass during initial alignment of the reaction mass.

A rub rail 58 is affixed to a lower upright portion 44 of the reaction mass. The function of the rub rail is to assist in the assembly of the components only.

Travel stops 60 are positioned along opposite sides of the reaction mass to control the maximum vertical displacement of the reaction mass. The travel stops include a pair of inverted U-shaped brackets 62 rigidly affixed to each side of the sub-structure 34 that supports the reaction mass. A separate rectangular shaped stop bar 64 is disposed inside each of the brackets. The stop bars are rigidly affixed to the sides of the horizontal slab portion 42 of the reaction mass. An adjustable contact 66 extends through the top of each inverted U-shaped bracket 62 to contact the stop bars 64 at an adjustable elevation to limit vertical travel of the reaction mass.

In the illustrated embodiment, the resilient bearing system avoids resonant frequencies generated in the test structure within the test frequency range of the object under test. A significant characteristic is the direct connection of the reaction mass components of this invention to the head expander without the use of an intermediate rigid structure that cannot otherwise be made sufficiently rigid to avoid the potential for unwanted mechanical resonances in the test system.

There are alternatives to air spring suspension of the reaction masses. The natural frequency of the reaction mass suspension system usually determines the lowest usable frequency of the equipment. The air springs as shown have a natural frequency of approximately 3 Hz. This means that effective isolation begins at a frequency of 1.414*3 Hz=4.24 Hz. The lowest usable frequency is typically at or above the isolation frequency. Other air spring designs can be configured to provide natural frequencies in the vicinity of one Hz and possibly lower.

The upper frequency limit is not defined by the behavior of the suspension mechanism. It is usually defined by the behavior of other items. Upper frequency limits of operation would be determined by the behavior of the shaker (vibration force generator), the behavior of the head expander (if one is present), and the allowable cross axis motion. Different test articles and different test profiles will have different limits on the maximum allowable cross axis motion.

Mechanical metal springs such as coil springs, leaf springs, and torsion bars may be used as alternatives to air spring suspension. Elastomeric springs such as those available from Barry Controls, Lord Corporation and Fabreeka could be considered. Overhead suspension of the reaction masses from long cables (pendulum style of support) may be considered.

There are alternatives to the reaction mass construction. Metals other than steel can be used. A combination of metals, such as steel and lead, could be considered. Concrete, or concrete and steel, or concrete, steel, and lead could be considered. Other combinations of materials can be used.

The proportions of length, width, height, and thickness can be varied to provide the desired mass and moment of inertia properties, and at the same time accommodate any space limitations that may be applicable. It may be desirable for the reaction mass elements to have as much damping included in their design as possible, if the frequencies applied during operation are at or near a resonant mode of the reaction mass. Damping limits the vibration response of the reaction mass structure if the vibration test includes frequencies at or near a resonant mode of the reaction mass.

Different test environments and the test items that are to be subjected to these vibration environments have different requirements for the range of frequencies applied during testing. Earthquake simulation will typically require low frequencies and larger displacements. Transportation simulation (auto, truck, train vibration) will have midrange vibration frequencies. Aviation and aerospace environments (flight vehicle environments) will often have high frequencies required in their simulation.

Resonances of the test article are often found within the range of frequencies that are applied. Some vibration test specifications are specifically designed to search for test article resonances.

When the vibration test is operated at or near a resonance frequency of the test article, the test article motion can produce larger forces that attempt to move the head expander out of the desired single degree of freedom linear axis. These disturbing forces are to be expected. It is the job of the guidance equipment to resist these forces and maintain the desired pure linear motion to the greatest extent possible.

The design approach of this invention is believed to be able to resist these cross axis forces better than existing designs because it connects the large reaction mass components to the head expander directly, without any significant intermediate structure that would normally introduce unwanted flexibility. In typical existing guidance designs, the cross axis motion forces generated by the test article attached to the head expander produce a deflection in the structural members that connect the head expander to the reaction mass. These deflections allow the head expander to deviate from the desired line of motion.

By choosing the proportions and weight of the reaction masses appropriately, the cross axis motions can be limited to any value desired based on assumed values for the disturbing forces and frequencies.

What is claimed is:

1. A single axis vibration test system comprising:
    a vibration force generator which includes a test object support base, the force generator inducing single axis motion in a test object affixed to the support base;
    a rigid supporting frame positioned adjacent to the force generator;
    cooperating coupling devices affixed to the supporting frame for supporting the test object support base for single axis vibration;
    a reaction mass mounted adjacent the support base and bearing supports mounted between the reaction mass and the test object support base to resist cross-axis motion;
    a rigid supporting sub-structure for supporting the reaction mass, the supporting sub-structure affixed to ground; and
    resilient support bearings between the reaction mass and the supporting sub-structure to disconnect any rigid mechanical connection between the reaction mass and ground.

2. Apparatus according to claim 1 in which the resilient bearings comprise air springs.

3. Apparatus according to claim 1 in which the support base includes a head expander.

4. Apparatus according to claim 1 in which the cooperating coupling devices include separate pairs of upper and lower hydrostatic slider bearings supported on the rigid supporting frame adjacent the exterior of the vibration force generator, the coupling devices carried on the supporting frame to apply opposing preload forces to the slider bearings.

5. Apparatus according to claim 1 in which the resonant frequency of the test system is outside the operating frequency of the vibrational energy applied to the test object.

6. Apparatus according to claim 1 in which the test object comprises a satellite.

7. Apparatus according to claim 1 in which the single axis vibration is in the vertical axis.

8. Apparatus according to claim 1 in which the reaction mass controls the position of the center of gravity of the reaction mass relative to the force generator.

9. Apparatus according to claim 4 in which a pair of said reaction masses are spaced apart adjacent the supporting frame, each reaction mass aligned with a corresponding pair of slider bearings and corresponding coupling device.

10. Apparatus according to claim 9 in which the reaction masses are spaced apart by approximately 90°.

11. Apparatus according to claim 1 in which the resilient support bearings comprise springs.

12. Apparatus according to claim 1 including adjustable vertical stops between the reaction mass and its supporting sub-structure.

13. Apparatus according to claim 1 in which the resilient support bearings comprise separate spaced apart air springs each with an internal adjustable inflated height controller.

14. A vibration test system comprising a vibration force generator which includes a support base for supporting a test object for vibration testing, a preload structure for supporting and guiding the test object for single axis vibration motion, the preload structure including a rigid supporting frame positioned adjacent to the force generator, and cooperating preload coupling devices affixed to the supporting frame for supporting the test object support base, a reaction mass mounted adjacent the test object support base, the reaction mass connected to the preload structure for minimizing cross-axis vibration in the axis of motion, a rigid supporting sub-structure affixed to ground and supporting the reaction mass, and a resilient support bearing system between the supporting sub-structure and the reaction mass to disconnect any rigid mechanical connection between the reaction mass and ground.

15. The improvement according to claim 14 in which the resonant frequency of the test system is outside the operating test frequency applied to the test object.

16. The improvement according to claim 14 in which the resilient support bearing system comprises air springs.

17. The improvement according to claim 14 in which the single axis vibration is in the vertical axis.

18. The improvement according to claim 14 in which the reaction mass is rigidly connected to a preload structure component comprising fixed self-aligning pad bearings that make sliding contact with the rigid supporting frame.

19. A vibration test system comprising a vibration force generator; a test object support base on the force generator for holding a test object subjected to vibrational test loads; a reaction mass positioned adjacent the support base; a rigid support structure affixed to the reaction mass to maintain the support base on a single degree of freedom linear axis resisting cross-axis motion during vibrational testing; the rigid support structure including a rigid supporting frame positioned adjacent to the force generator and support bearings carred on the supporting frame for contacting the support base; and a resilient support system between the reaction mass and a stationary ground.

20. Apparatus according to claim 19 in which the resilient support system comprises air springs between the reaction mass and a rigid substructure affixed to ground.

* * * * *